United States Patent [19]

Niebylski

[11] Patent Number: 4,873,353

[45] Date of Patent: Oct. 10, 1989

[54] PRECERAMIC COMPOSITIONS AND CERAMIC PRODUCTS

[75] Inventor: Leonard M. Niebylski, Baton Rouge, La.

[73] Assignee: Ethyl Corporation, Richmond, Va.

[21] Appl. No.: 306,097

[22] Filed: Feb. 6, 1989

[51] Int. Cl.$^4$ ................................................. C07F 7/08
[52] U.S. Cl. .................................. 556/402; 556/403; 528/25; 528/29
[58] Field of Search .................. 556/402, 403; 528/25, 528/29

[56] References Cited

U.S. PATENT DOCUMENTS

| | | | |
|---|---|---|---|
| 3,029,211 | 4/1962 | Groszos | 556/402 L X |
| 4,052,430 | 10/1977 | Yajima et al. | 556/430 |
| 4,220,600 | 9/1980 | Yajima et al. | 556/434 |
| 4,228,270 | 10/1980 | Kobayashi | 556/402 X |
| 4,260,280 | 4/1981 | West | 556/430 |
| 4,631,179 | 12/1986 | Smith, Jr. | 423/345 |
| 4,767,728 | 8/1988 | Riccitiello et al. | 556/402 X |

*Primary Examiner*—Paul F. Shaver
*Attorney, Agent, or Firm*—Patricia J. Hogan

[57] ABSTRACT

Preceramic compositions which have particular utility in providing protective ceramic coatings on carbon/carbon composites, graphite, carbon fibers, and other normally oxidizable materials are prepared by mixing about 0.25–20 parts by weight of a trialkoxy-, triaryloxy-, or tri(arylalkoxy)boroxine with one part by weight of a polycarbosilane in an organic solvent.

20 Claims, No Drawings

PRECERAMIC COMPOSITIONS AND CERAMIC PRODUCTS

FIELD OF THE INVENTION

This invention relates to ceramic materials derived from polycarbosilanes and more particularly to such materials which are useful as protective coatings.

BACKGROUND

It is known that many materials, such as carbon/carbon composites, carbon fibers, graphite, and certain metals, have properties which make them attractive for use in aerospace and other applications in which their susceptibility to oxidative deterioration at elevated temperatures is a serious disadvantage. Such materials, as well as other materials like alumina, silica, lithia, mullite, etc., can also be damaged by heat, abrasion, or corrosion. It would be desirable to find a means of protecting those materials, and it has been proposed to provide such protection with ceramic coatings. However, known ceramic coatings have proved to be inadequate.

As disclosed in U.S. Pat. Nos. 4,052,430 (Yajima et al.-I), 4,220,600 (Yajima et al.-II), 4,260,780 (West), and 4,631,179 (Smith), it is known that ceramics can be obtained from polycarbosilanes.

SUMMARY OF INVENTION

An object of this invention is to provide novel preceramic compositions.

Another object is to provide such compositions which can be converted to protective ceramic coatings.

These and other objects are attained by mixing about 0.25-20 parts by weight of a trialkoxy-, triaryloxy-, or tri(arylalkoxy)boroxine with one part by weight of a polycarbosilane in an organic solvent.

DETAILED DESCRIPTION

The polycarbosilane which is mixed with the boroxine may be any polycarbosilane that is soluble in common organic solvents, such as aliphatic or aromatic hydrocarbons, dialkyl or alicyclic ethers, etc.; and it may be, e.g., a polycarbosilane of Yajima et al.-I, Yajima et al.-II, West, or Smith, the teachings of all of which are incorporated herein in toto by reference.

The boroxine reactant is generally a compound corresponding to the formula:

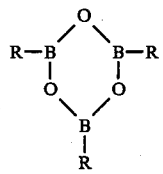

wherein R is an alkoxy, aryloxy, or arylalkoxy group, preferably an alkoxy, phenoxy, alkoxyphenoxy, phenalkoxy, or alkylphenalkoxy group in which any alkyl or alkoxy group contains 1-6 carbons, such as the trimethoxy-, triethoxy-, tripropoxy-, tributoxy-, tripentoxy-, trihexoxy-, triphenoxy-, tritolyloxy-, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, tritolylethoxyboroxine, etc. It is preferably trimethoxyboroxine or triphenoxyboroxine. Regardless of the particular boroxine used, the amount employed is about 0.25-20 parts per part by weight of the polycarbosilane. However, when the boroxine is a trialkoxyboroxine, it is generally preferred to use about 1-6, most preferably about 3-4 parts per part by weight of polycarbosilane; and, when the boroxine is a triaryloxyboroxine, it is generally preferred to employ about 1-10, most preferably about 6-8 parts per part by weight of polycarbosilane.

To prepare the preceramic compositions of the invention, the neat boroxine (if sufficiently low melting) or a solution thereof in an organic solvent is mixed with a solution of the polycarbosilane in an organic solvent. In a preferred embodiment of the invention in which the process is conducted so as to form a product solution that is directly utilizable as a coating composition, the polycarbosilane solution that is used is a clear solution; and the total amount of solvent employed is such as to provide a solids content of about 5-75%, preferably about 40-60% by weight.

The solvent employed for the boroxine and/or polycarbosilane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof. When it is desired to use a mixture of solvents for the reaction, the desired mixture may be introduced as the solvent for the polycarbosilane or for both the polycarbosilane and the boroxine, or different solvents may be used for the polycarbosilane and the boroxine.

The preceramic compositions of the invention are useful for making ceramic fibers, filaments, flakes, powders, films, coatings, mats, woven fabrics, slabs, sleeves, structural composites, and other shaped articles; and, like other preceramic materials, they may be used in combination with other ingredients, such as lubricants or ceramic powders, fibers, or whiskers, etc., when appropriate. An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, tungsten, titanium, and the metals of the lanthanide and actinide series.) However, they are also useful in improving the physical properties, thermal stability, and abrasion resistance of substrates, such as those mentioned above, silica foams, alumina fibers and discs, mullite, ceramic cloths (e.g., cloths formed from alumina, silica, and/or lithia), etc. These advantages are of particular importance in the protection of carbon/carbon composites, graphite, and metals used in aerospace applications, such as engine components, advanced nozzle system components, and high-temperature vehicle structures.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

The preceramic coating compositions may be applied to the substrates in any suitable manner, such as by rolling, spraying, swabbing, or brushing, to form coatings having the desired thickness, generally a thickness of up to about 1000 micrometers, frequently a thickness of about 10–250 micrometers. A coating of a desired thickness can be achieved by applying a single coating of that thickness or by applying the precursor polymer coating composition in multiple thinner layers. For example, when relatively thick coatings are desired, it is preferred to apply the coating composition in layers of about 25–100 micrometers, each layer being dried by driving off the solvent before the next layer is applied.

When temperatures as high as about 200°–250° C. are used to drive off high boiling solvents, some pyrolysis of the preceramic composition is initiated during the drying of the coating composition. However, higher temperatures, i.e., about 675°–900° C., preferably about 825°–875° C., are required to convert the preceramic coating to a ceramic coating. This pyrolysis may be delayed until the final desired thickness of preceramic coating has been deposited, even when the coating is applied in multiple layers. However, when the coating is applied in multiple layers, it is generally preferred to pyrolyze each one or two layers of dried preceramic coating before applying the next layer of coating composition. The time required for the pyrolysis is generally about 1–60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

After the pyrolysis, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polycarbosilane and compositions formed from it in a dry atmosphere until a layer of ceramic has been formed because of the susceptibility of the preceramic materials to attack by water and other compounds having active hydrogens.

The following examples are given to illustrate the invention and are not intended as a limitation thereof.

EXAMPLE I

A clear solution of 14 g of trimethoxyboroxine in 16 g of xylene was added to a solution of 4 g of a polycarbosilane of Yajima et al. in 16 g of xylene. After the blend had been allowed to stand overnight, some gelatinous material was noted in the lower level of the blend—an indication that some reaction may have occurred, since neither the polycarbosilane/xylene nor the trimethoxyboroxine/xylene forms a gel when stored individually. Shaking caused the gel to go into solution to form a clear blend which was designated as PCMB.

EXAMPLE II

Example I was essentially repeated except that the 14 g of trimethoxyboroxine was replaced with 32 g of triphenoxyboroxine. The clear blend that was formed was designated as PCPB.

EXAMPLE III

Graphite coupons having nominal dimensions of about 2.5 cm × 2.5 cm × 0.3 cm were abraded to provide a smooth finish, cleaned, vacuum dried, thoroushly swab-coated in a dry atmosphere with PCMB, dried at 100°–11° C., heated at 130° C. for a few minutes, heated at 200°–250° C. for 5–15 minutes, and cooled to provide coupons having a coating thickness of about 0.08–0.1 mm.

The preceramic coatings were then pyrolyzed to ceramic coats by heating the coated coupons to 825°–850° C., holding at that temperature for 5–30 minutes, and cooling to room temperature at a rate of 10°–20° C./minute.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 650° C. Periodically the holder and specimen were removed from the furnace and quenched in ambient air, the cooled specimen was weighed and remounted in its holder, and the holder and specimen were replaced in the heated furnace for additional heating in air. The results of the test are shown below.

| Time (hrs.) | % Weight Loss on Oxidation |
| --- | --- |
| 3 | 0.1–0.1 |
| 8 | 0.3–0.3 |
| 24 | 4.1–4.2 |

EXAMPLE IV

Example III was essentially repeated except that the graphite coupons which were coated with PCMB were coupons having dimensions twice the dimensions of the coupons of Example III. The results of the oxidation test are shown below.

| Time (hrs.) | % Weight Loss on Oxidation |
| --- | --- |
| 3 | 0.1 |
| 8 | 0.2 |
| 24 | 1.9 |

These weight losses compare with weight losses of 32% after 8 hours and 100% after 24 hours when uncoated graphite coupons having the same dimensions were subjected to the same oxidation test.

EXAMPLE V

Example III was essentially repeated except that the graphite coupons were coated with PCPB instead of PCMB. The results of the oxidation test are shown below.

| Time (hrs.) | % Weight Loss on Oxidation |
| --- | --- |
| 3 | 0.2 |
| 8 | 0.5 |
| 24 | 2.3 |

It is obvious that many variations can be made in the products and processes set forth above without departing from the spirit and scope of this invention.

What is claimed is:

1. A process which comprises mixing about 0.25-20 parts by weight of a trialkoxy-, triaryloxy-, or tri(arylalkoxy)boroxine with one part by weight of a polycarbosilane in an organic solvent.

2. The process of claim 1 wherein the boroxine is a compound corresponding to the formula:

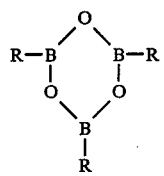

in which R is an alkoxy, phenoxy, alkylphenoxy, phenalkoxy, or alkylphenalkoxy substituent in which any alkyl or alkoxy group contains 1-6 carbons.

3. The process of claim 2 wherein the boroxine is triphenoxyboroxine.

4. The process of claim 2 wherein the boroxine is trimethoxyboroxine.

5. The process of claim 1 wherein the boroxine is a triaryloxyboroxine and the boroxine/polycarbosilane weight ratio is about 1-10/1.

6. The process of claim 5 wherein the boroxine/polycarbosilane weight ratio is about 6-8/1.

7. The process of claim 1 wherein the boroxine is a trialkoxyboroxine and the boroxine/polycarbosilane weight ratio is about 1-6/1.

8. The process of claim 7 wherein the boroxine/polycarbosilane weight ratio is about 3-4/1.

9. The process of claim 1 wherein about 6-8 parts by weight of triphenoxyboroxine are mixed with a solution of one part by weight of a polycarbosilane in an organic solvent.

10. The process of claim 1 wherein about 3-4 parts by weight of trimethoxyboroxine are mixed with a solution of one part by weight of a polycarbosilane in an organic solvent.

11. A composition prepared by the process of claim 1.
12. A composition prepared by the process of claim 2.
13. A composition prepared by the process of claim 3.
14. A composition prepared by the process of claim 4.
15. A composition prepared by the process of claim 5.
16. A composition prepared by the process of claim 6.
17. A composition prepared by the process of claim 7.
18. A composition prepared by the process of claim 8.
19. A composition prepared by the process of claim 9.
20. A composition prepared by the process of claim 10.